UNITED STATES PATENT OFFICE.

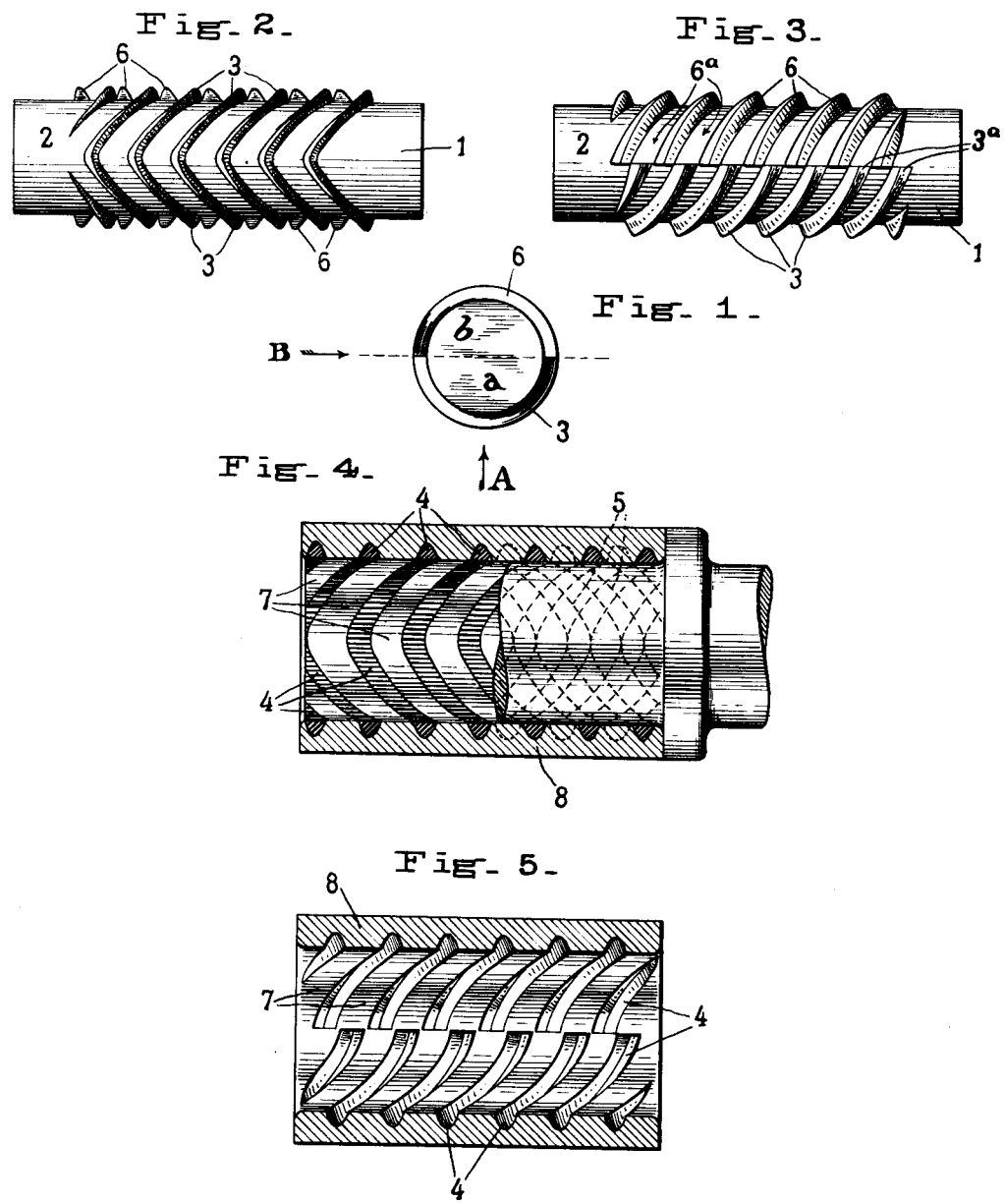

LEIGH S. BACHE, OF BOUNDBROOK, NEW JERSEY, ASSIGNOR TO THE GRAPHITE LUBRICATING COMPANY, OF BOUNDBROOK, NEW JERSEY, A CORPORATION OF NEW JERSEY.

SELF-LUBRICATING BEARING.

1,132,758. Specification of Letters Patent. Patented Mar. 23, 1915.

Application filed July 25, 1913. Serial No. 781,139.

*To all whom it may concern:*

Be it known that I, LEIGH S. BACHE, a citizen of the United States, and a resident of Boundbrook, in the county of Somerset and State of New Jersey, have invented certain new and useful Improvements in Self-Lubricating Bearings, of which the following is a full, clear, and exact description, whereby any one skilled in the art may make and use the same.

The invention relates to self-lubricating bearings, that is, a bearing in which the metallic parts are constantly lubricated due to the inherent characteristics of the materials and their arrangement.

It relates more particularly to a bearing or journal box formed from metal and having a peculiar and unique arrangement of broken bearing surfaces producing holders for a material which will act not only as a support for the bearing, but as a lubricant for the moving parts.

The object of the invention is to provide as ample a metallic bearing surface as possible which surface is intersected by lines of lubricating material so arranged and disposed that every part of the metallic surface will receive lubrication.

A further object of the invention is to provide for a maximum amount of lubricating surface without weakening the supporting strength of the harder metallic portions of the bearing.

It is also an object to so arrange the laminæ of metallic and lubricating substances that a very slight rotary movement will effectually carry the lubrication completely over all of the metallic surfaces and an incidental object thereto is to have the arrangement of metallic and lubricating materials so disposed that the lubricant will not be carried outside of the metallic bearing.

Referring to the drawings: Figure 1 is a cross-sectional view through the core upon which the journal box or bearing is cast. Fig. 2 is a side view of said core looking in the direction of the arrow A, Fig. 1. Fig. 3 is a similar side view looking in the direction of the arrow B, Fig. 1. Fig. 4 is a sectional view with parts broken away illustrating the lower half of the bearing, the portion of a shaft and in dotted lines the position of the lubricating grooves of the upper half of the bearing. Fig. 5 is a horizontal sectional view taken at right angles to the section illustrated in Fig. 4.

It has been common practice to provide self-lubricating bearings of various sorts including bearings which, as to their general composition of materials (namely, graphite and metal) are somewhat analogous to the invention hereinafter described. Heretofore bearings have been formed of metal having graphite inserted in the bearing face to provide an anti-friction surface for the shaft or like part and this graphite composition has been inserted in the bearing shell or body-part in various forms including a form where the interior of the metallic shell has had formed therein by casting or machining a spiral groove or rather a series of spiral grooves running in parallelism one with the other and extending substantially from end to end of the bearing shell or bushing. This spiral groove has, by various processes, been filled with a composition of graphite and obviously, as the shaft is rotated in the bearing, the graphite will form a lubricating film and be evenly disposed over the entire bearing surface. Such a form, while quite efficient, has the objection of tending to carry the graphite in a film out of the bearing and unless the shaft makes a full revolution, the film of graphite will not always carry over the entire metallic surface of the bearing.

It is not an unusual practice to use a metal of a different character than the shaft for the bearing box and it is true that where, for instance, steel is run upon bronze or a softer metal that particles of the metal will pick up and thus induce heat in the bearing unless provision is made by oil or another lubricant for preventing such an action.

With a bearing of bronze having graphite inserts arranged therein, a very good lubrication is secured and provided the graphite is so disposed that the entire metallic surface of the metallic box and shaft are constantly subjected to its action, so that a film of graphite will exist over the entire surface of the metal, an ideal self-lubricating bearing is secured.

The spiral form of inserted graphite above referred to is the nearest approach to such an arrangement as to give perfect surface disposition of the graphite but this is only efficacious where shafts make a complete revolution. In such a structure, the metallic portions of the bearing surfaces are arranged in spiral paths intermediate the parallel spirals of the lubricating graphite material and there must of necessity be a comparatively close thread arrangement of the spirals of the graphite to effectively lubricate the metallic surface. This, of course, detracts from the weight-sustaining efficiency of the bearing as it is always desirable to have the greatest possible metallic surface to sustain the weights.

The invention herein defined obviates the faults of such a structure by providing a maximum metallic surface for the bearing with the lubricating grooves so disposed that the entire surface of the metal will receive the lubricating action even during a partial rotation of the shaft.

Obviously, the invention, while herein described as pertaining to a lubricant of a substantially hard character, such as graphite inserted in the grooves, might be very efficient as a lubricating medium by using the channels merely as conductors for a fluid oil and it is the form and arrangement of these channels which constitutes the essential feature of the invention.

Referring to the drawings the numeral 1 denotes a core about which the metallic portion of the bearing or bushing is formed. The core is illustrated to more clearly indicate the arrangement of the parts. This core has a main cylindrical portion 2 which corresponds to the metallic surface of the bearing box and is covered as to the whole or a portion of its length with ribs 3 arranged in parallelism in what might well be termed "spiral herring-bone" arrangement. Obviously, the herring-bone ribs of the core will be reproduced in the metallic shell of the bearing as complementary grooves having the same form and arrangement.

To more clearly illustrate the formation and arrangement of the grooves of the shell, attention is called to the illustration of the cores in Figs. 1, 2 and 3 wherein the ribs 3 of Figs. 2 and 3 correspond with the arrangement of the ribs on one half of the core a of Fig. 1 and the ribs 6 show the arrangement on the opposite half of the core b. It will be noted that the herring-bone formation on the section a is opposed in its arrangement to the herring-bone formation on the section b and at the meeting line of the respective halves a and b. The ribs 3 and 6 are not joined together but are arranged in staggered relation, that is, the ends 3ᵃ of the ribs 3 terminate opposite the intermediate openings 6ᵃ which are left between the ends of the ribs 6.

Obviously the depressions or openings 6ᵃ correspond to the metal surface of the bearing 7 of Figs. 4 and 5 while the ribs correspond to the lubricating material of the grooves 4 in said figures. In other words, the grooves 4 and surfaces 7 are complementary to the ribs and cylindrical surfaces of the core.

The arrangement of the lubricating sections and metallic sections of the bearing are perhaps best illustrated in Figs. 4 and 5, where the full showing of the grooves and surfaces 4 and 7 is illustrated in the lower part of the section while the dotted lines 5 illustrate the grooves in the upper section. With this arrangement of the parts it is apparent that even a partial rotation of the shaft will carry the lubricant from the herring-bone grooves directly and completely across the entire metal surface of the bearing, in as much as there is a lubricant at all points so disposed that a partial rotation will carry it directly over all of the intermediate surfaces of the metallic bearing as the shaft is oscillated or rotated. Furthermore, the opposed herring-bone arrangement of the spiral grooves tends to keep the lubricant always within the bearing rather than to work it out by a spiral action as in the case of spiral grooves formed continuously from end to end of the bearing. In manufacturing these devices, the bearing shells 8 are cast upon the core 1 and thereupon the cylindrical opening through the shell is filled with a graphite composition which upon being subjected to action of hydraulic presses is very firmly compressed in the grooves. A plunger or broach is then passed through the bearing which carries out the excess graphite and leaves the grooves filled even with the surface of the metal.

After vulcanization, the interior and exterior diameters of the metallic casing are bored and finished to exact size.

Of course, the invention is not restricted to a solid bushing type of bearing as obviously, split bearings may be formed with the same arrangement of lubricating grooves and metallic surfaces.

The invention is not to be considered as restricted to a bronze metallic casing with a graphite filling as obviously, other metals might be used in conjunction with other suitable lubricating materials, although the best results have been attained by using a bronze shell having its opposed herring-bone grooves packed with a graphite composition. This is in part due to the characteristics of graphite which when introduced as above described or to extremely high pressures becomes effective to sustain weight of the shaft in conjunction with the metal of the bearing and at the same time provides a constant and practically perfect lubrication. Bearings made in this manner do not wear appreciably and run without heating and without oil. Oil, however, does no harm when applied to such a bearing.

There are many instances where bearings are employed on shafts which do not make a complete revolution. A good illustration of this is in spring shafts where the rotary movements are confined to a comparatively short angular movement of the shaft. In such a case, it is apparent that a short oscillatory movement of the shaft would not properly carry the lubricant over the entire surface of the metal in the ordinary type of bearing and therefore, the bearing would wear as to a portion of its surface. With the arrangement hereinabove described, a very slight movement of the shaft insures constant movement over the lubricant and the carrying of said lubricant over every particle of the metallic face of the bearing.

What I claim as my invention and desire to secure by Letters Patent is:

1. A bearing having lubricating grooves in opposed halves of the bearing, the grooves of one half terminating in staggered relation between the grooves in the opposed half.

2. A bearing having lubricating grooves arranged in spiral herring-bone formation in opposite halves of the bearing, the herring-bone grooves of one half of the bearing being opposed in their position to the grooves of the opposite half of the bearing whereby the advancing points of the herring-bone grooves in one side of the bearing extend in an opposite direction to those in the opposed half of the bearing.

3. A bearing having lubricating grooves in opposed halves of the bearing, the grooves of one half terminating in staggered relation between the grooves in the opposed half and a graphite composition filling said grooves.

4. A bearing having lubricating grooves arranged in spiral herring-bone formation in opposite halves of the bearing, the herring-bone grooves of one half of the bearing being opposed in their position to the grooves of the opposite half of the bearing whereby the advancing points of the herring-bone grooves in one side are opposed to those in the other side of the bearing, and a graphite composition filling said grooves.

5. A bearing having bearing surfaces arranged in herring-bone spiral formation on opposite halves of the bearing and with intermediate grooves of spiral herring-bone formation intermediate said surfaces, the grooves and surfaces of one half of the bearing being opposed in their spiral direction to the grooves and surfaces of the opposite half of the bearing whereby the grooves terminating at each 180° are staggered with reference to each other.

6. A bearing having bearing surfaces of spiral herring-bone formation with intermediate spiral herring-bones of lubricant, the spirals of lubricant of one half of the bearing terminating centrally of the spiral bearing surfaces of the opposite half of the bearing whereby the grooves for 180° of the bearing terminate in staggered relation to the grooves in the second 180° of the bearing.

LEIGH S. BACHE.

Witnesses:
L. V. ROUSSEAU,
S. A. KING.